Aug. 17, 1965    H. A. WICKARD    3,201,171
RETRACTABLE TRUCK BODY COVER WITH TENSION CONTROL
Filed Feb. 19, 1964    3 Sheets-Sheet 1

Harry A. Wickard
INVENTOR.

BY
Attorneys

Aug. 17, 1965  H. A. WICKARD  3,201,171
RETRACTABLE TRUCK BODY COVER WITH TENSION CONTROL
Filed Feb. 19, 1964  3 Sheets-Sheet 2
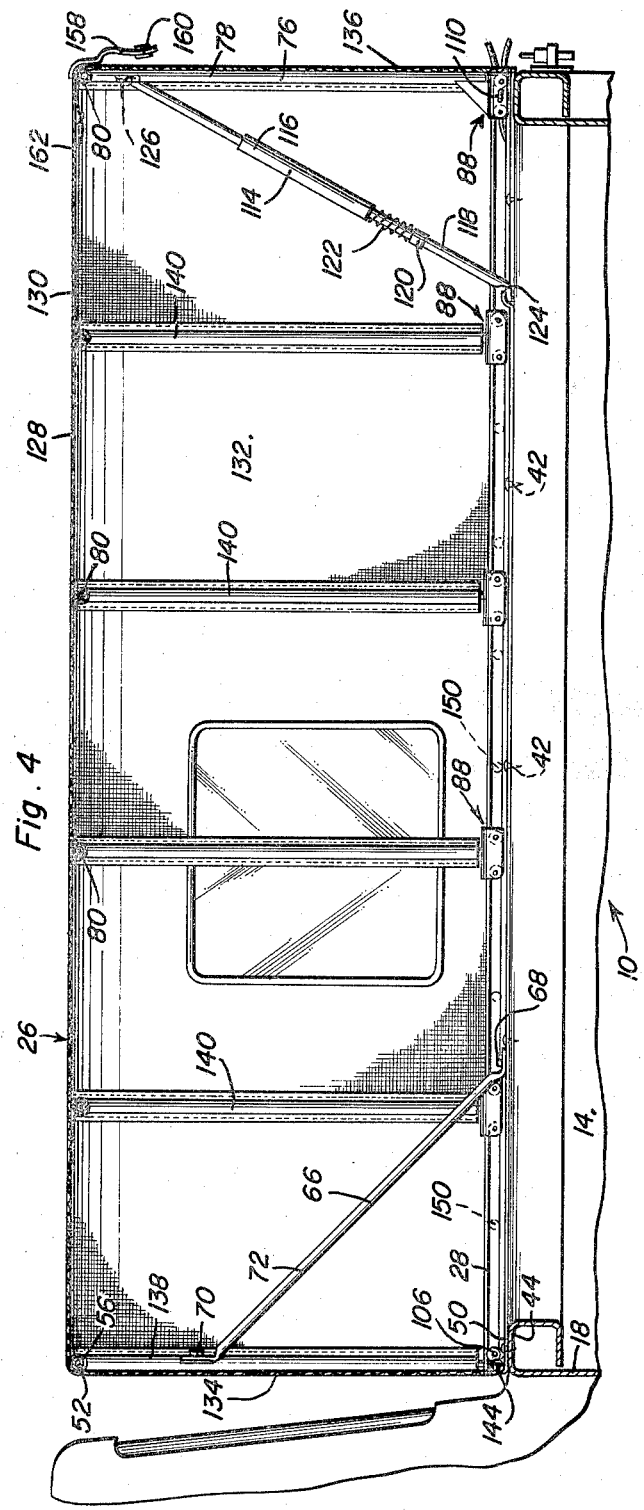
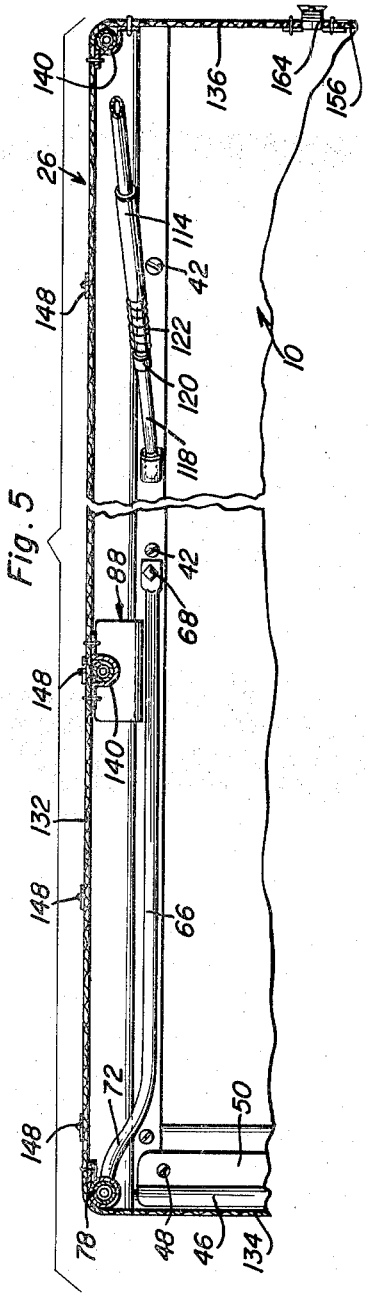
Harry A. Wickard
INVENTOR.
BY *Clarence A. O'Brien*
*and Harvey B. Jacobson*
Attorneys

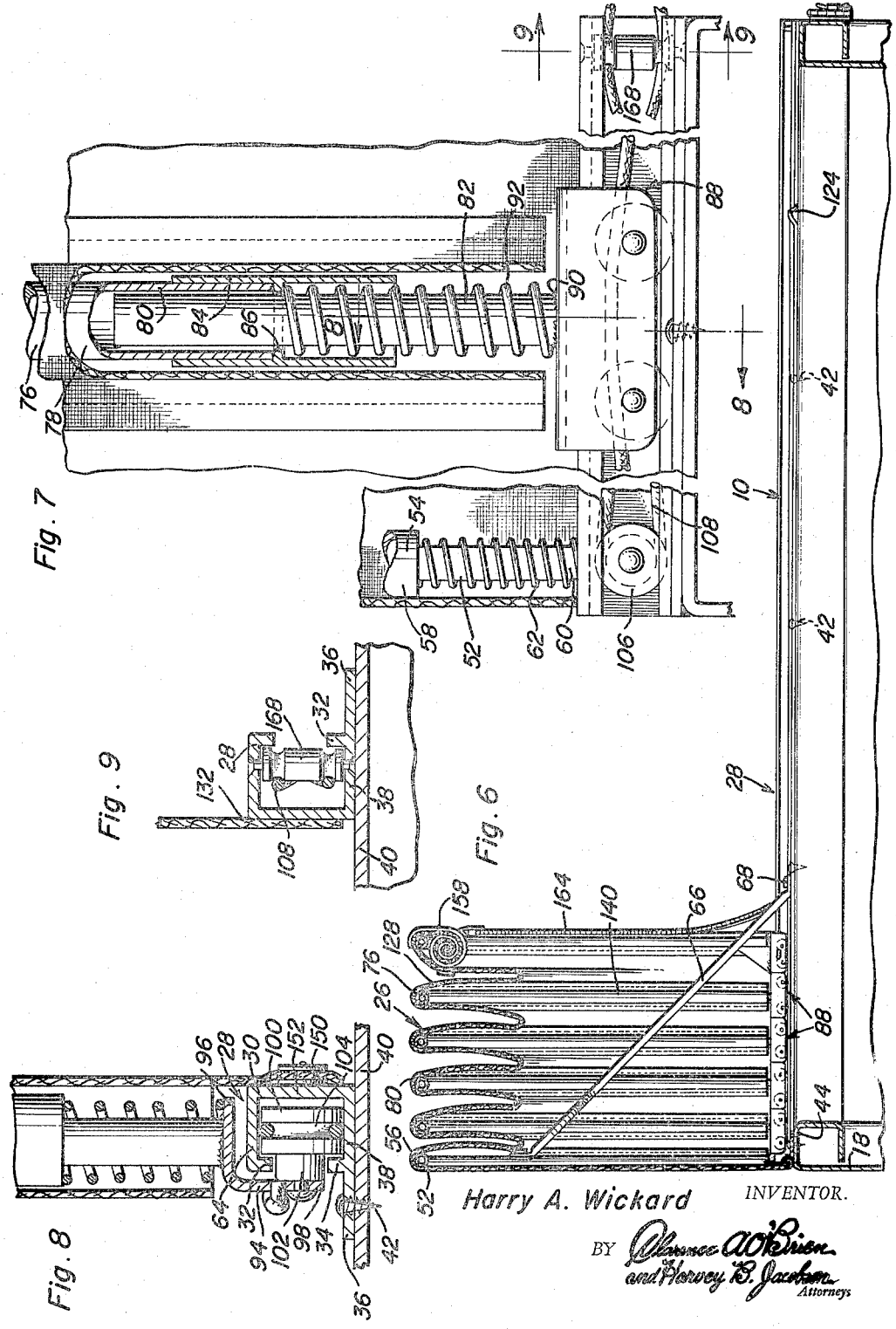

United States Patent Office 3,201,171
Patented Aug. 17, 1965

3,201,171
RETRACTABLE TRUCK BODY COVER WITH
TENSION CONTROL
Harry A. Wickard, Rapid City, S. Dak., assignor to Re-Trac-To, Inc., a corporation of South Dakota
Filed Feb. 19, 1964, Ser. No. 345,900
3 Claims. (Cl. 296—100)

This invention relates to a novel and useful retractable truck body cover assembly for the load bed of a pickup truck and is specifically constructed so as to readily conform to and be adapted for mounting on substantially all types of pickup truck load beds.

The retractable truck body cover of the instant invention comprises an improvement over conventional forms of truck body covers. The novel retractable truck body cover assembly of the instant invention includes a pair of elongated guide members adapted for securement to the upper edges of the upstanding side walls of a truck body load bed. A plurality of generally inverted U-shaped bows each including a pair of depending legs are supported from the elongated guide members by means of pairs of corresponding followers which are slidably engaged with the guide members for movement longitudinally therealong and are secured to the lower ends of the bows of the cover assembly. A weatherproof cover is disposed over the bows and secured thereto. The cover includes a depending front wall at the forward end of the cover and a rear wall including a rolled down flap which may be zipped along its upstanding side edges to the corresponding portions of the rear wall. In this manner, the entire load bed of a pickup truck or the like may be enclosed. The lower edges of the sides of the cover and the elongated guide members are provided with coacting attaching means whereby the lower edges of the sides of the cover may be secured to the guide members. In addition, the lower edges of the front wall include means adapted for removable securement to the upper marginal edge portions of the front wall of a pickup truck load bed.

The guide members are provided with pulley means at their forward ends and elongated pull members are entrained over the pulley means and extend to the rear ends of the guide members and are secured to the movable bows of the cover assembly, the latter also including a forwardmost fixed bow. The pull members may be utilized to move all but the forwardmost bow longitudinally of the truck body in order that the cover assembly may be moved between extended and retracted positions.

While the foregoing outline of the truck body cover construction of the instant invention differs only slightly from conventional forms of retractable truck body covers, the instant invention includes bows whose depending legs are extensible and which are provided with means yieldingly urging the legs of the bows toward extended positions. In this manner, the cover, which is disposed over the bows and secured along the lower edge portions of its opposite sides to the elongated guide members, may be transversely tensioned. In addition, the forwardmost fixed bow of the cover assembly of the instant invention includes inclined brace means resisting rearward deflection of the upper portion of the bow and the cover assembly additionally includes rear inclined brace members which may be removably secured between the guide members and the rearmost slidable bow of the cover assembly and which are extensible and yieldingly urged toward extended positions. The rear inclined brace members thereby longitudinally tension the cover secured over the bows by yieldingly urging the upper portion of the rearmost bow away from the upper portion of the forwardmost fixed bow of the cover assembly.

The main object of this invention is to provide a novel and useful retractable truck body cover construction for the load bed of a pickup truck or the like.

A further object of this invention is to provide a retractable truck body cover construction specifically designed to be adapted for securement to various types of pickup truck load beds now commercially available.

Yet another object of this invention is to provide a retractable truck body cover assembly for the load bed of a pickup truck or the like including means by which a substantially water-tight enclosure may be provided for the load bed.

Still another object of this invention is to provide a cover construction in accordance with the preceding objects constructed in a manner whereby the cover construction may be moved to a retracted position, so as to uncover and expose substantially all of the load bed of the pickup truck to which it is secured.

A further object of this invention is to provide a truck body cover construction including means by which the cover may be longitudinally and transversely tensioned so as to compensate for shrinkage of the flexible cover.

A final object of this invention to be specifically enumerated herein is to provide a retractable truck body cover construction for a load bed of a pickup truck or the like and in accordance with the preceding objects which will conform to conventional forms of manufacture, be of simple construction and easy to install so as to provide a device that will be economically feasible, long lasting and relatively trouble free in installation.

These together with other objects and advantages which will become subsequently apparent reside in the details of construction and operation as more fully hereinafter described and claimed, reference being had to the accompanying drawings forming a part hereof, wherein like numerals refer to like parts throughout and in which:

FIGURE 4 is an enlarged fragmentary longitudinal vertical sectional view taken substantially upon a plane indicated by section line 4—4 of FIGURE 1;

FIGURE 5 is a fragmentary enlarged horizontal sectional view taken substantially upon a plane passing through the truck body cover assembly spaced above the inclined brace members thereof;

FIGURE 6 is a fragmentary enlarged longitudinal vertical sectional view similar to that of FIGURE 4 but shown with the truck body construction in a retracted position;

FIGURE 7 is a fragmentary enlarged side elevational view of one side of the cover construction as seen from the interior thereof with portions of the cover construction being broken away and shown in section;

FIGURE 8 is a fragmentary transverse vertical sectional view taken substantially upon a plane indicated by section line 8—8 of FIGURE 7; and FIGURE 9 is a transverse vertical sectional view taken substantially upon a plane indicated by section line 9—9 of FIGURE 7.

Figure 1:
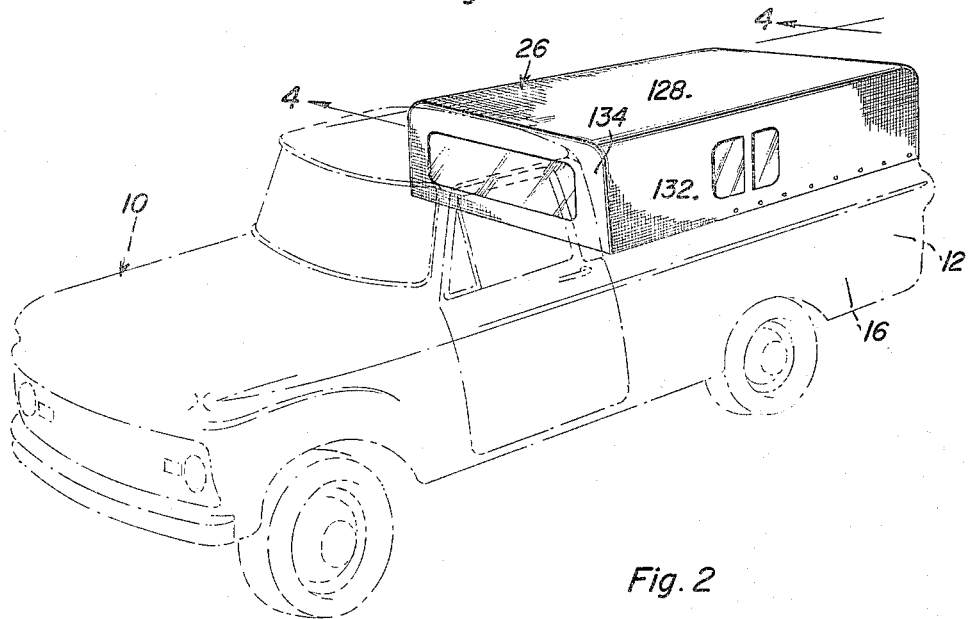
FIGURE 1 is a perspective view of a conventional form of pickup truck shown in phantom lines with the retractable truck body cover construction of the instant invention shown in an operative position thereon completely enclosing the load bed of the pickup truck.
Figure 2:
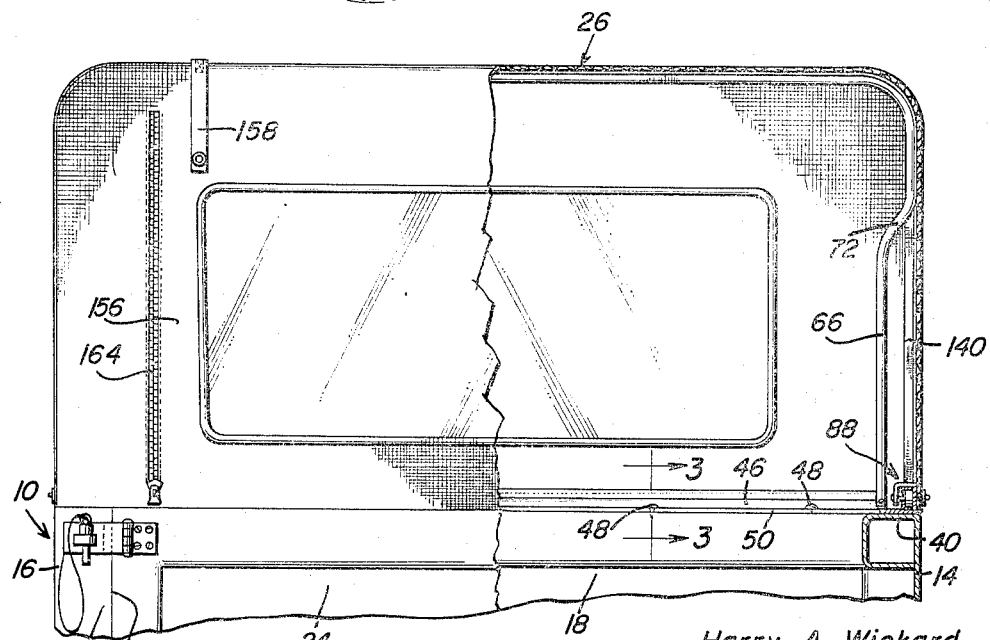
FIGURE 2 is a fragmentary enlarged rear elevational view of the pickup truck illustrated in FIGURE 1 with portions of the cover assembly being broken in section.
Figure 3:
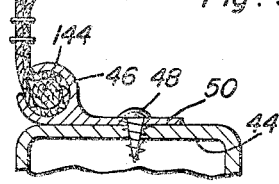
FIGURE 3 is a fragmentary longitudinal sectional view taken substantially upon a plane indicated by section line 3—3 of FIGURE 2.

With attention now directed more specifically to the drawings the numeral 10 generally designates a conventional form of pickup truck including a load bed generally referred to by the reference numeral 12 including upstanding opposite side walls 14 and 16, an upstanding front wall 18 and an upstanding rear wall 20 defining an opening 22 between opposite side portions thereof which is closed by means of a hinged tailgate 24.

The retractable, flexible truck body cover assembly of the instant invention is generally referred to by the reference numeral 26 and includes a pair of right and left handed elongated guide members generally referred to by the reference numeral 28. As can best be seen from FIGURES 8 and 9 of the drawings, each of the guide members 28 is in the form of a generally rectangular tubular member 30 having a longitudinal slot 32 formed in the inner wall 34 thereof. Each tubular member 30 includes an inwardly directed mounting flange 36 which is formed integrally with its bottom wall 38 and forms an extension thereof.

The upper ends of the side walls 14 and 16 each include an upper wall 40 to which the corresponding guide member 28 is secured by means of fasteners 42 secured through the flange portions 36 and to the upper wall 40. In addition, it may be seen that the front wall 18 includes a top wall 44 and that a bead retaining channel member 46 is secured thereto by means of a plurality of fasteners 48 secured through a mounting flange portion 50 formed integrally with the bead retaining channel member 46.

The cover assembly 26 includes a first fixed forward bow 52 including a pair of depending legs 54 interconnected at their upper ends by means of an integral bight portion 56. The legs 54 of the bow 52 each include an outer tubular portion 58 and an inner tubular portion 60, each inner tubular portion 60 being telescopingly received within the lower end of the corresponding outer tubular portion 58 and yieldably urged toward an extended position by means of an expansion spring 62.

Each inner tubular portion 60 is secured to the upper wall 64 of the corresponding tubular member 30 in any convenient manner such as by welding and a pair of inclined rigid brace members 66 are provided and are secured at their lower ends to the upper wall 64 in any convenient manner such as by fasteners 68 a spaced distance rearwardly of the front wall 18 and to an upper portion of the corresponding leg by means of a suitable fastener 70. From FIGURE 5 of the drawings it may be seen that each inclined brace 66 includes a laterally offset upper end portion 72 through whose free end portion the corresponding fastener 70 is secured.

In addition to the bow 52, the cover assembly 26 includes a plurality of movable bows 76 each also including a pair of depending legs 78 interconnected at their upper end portions by means of an integral bight portion 80.

Each of the legs 78 includes an outer tubular member 80 and an inner tubular member 82. The inner tubular members 82 are telescoped in the lower ends of the outer tubular members 80 and a connecting sleeve 84 is provided and telescoped over each outer tubular member 80. Each connecting sleeve 84 includes an inwardly projecting circumferential abutment flange 86 against which the lower end of the corresponding outer tubular member 80 abuts and the lower end of each inner tubular member 82 is fixedly secured to a follower assembly generally referred to by the reference numeral 88 in any convenient manner such as by welding 90. A compression spring 92 is disposed about each inner tubular member 82 and between the corresponding follower member and the corresponding abutment flange 86 and thereby yieldingly urges the corresponding leg 78 to an extended position.

As can best be seen from FIGURES 7 and 8 of the drawings each of the follower assemblies includes a generally L-shaped panel portion 94 including an upper horizontal flange 96 and a substantially vertically disposed lower flange 98. A pair of grooved rollers 100 are journalled from each of the vertical flanges 98 and include diametrically reduced hub portions 102 which are slidably received in the corresponding slot 32. The rollers or wheels 100 are confined within the tubular members 30 and roll on the upper surface of the bottom wall 38 thereof.

Each of the rollers 100 is provided with a circumferential groove 104 and a pulley wheel 106 is journalled in the forward end of each of the guide members 28 with an elongated flexible tension member 108 entrained thereover. One free end portion of each tension member 108 overlies the upper surface of the corresponding bottom wall 38 and is received in the lower portions of the corresopnding grooves 104. The other free end portion of the tension member 108 is secured to rearmost follower assembly 88 by being passed outwardly through a horizontal slot 110 and knotted and then passed back through that slot 110. In this manner, a rearward pull on the free end portion of the tension member 108 secured to the follower assembly 88 will effect an extension of the cover assembly 26 to the fully extended position illustrated in FIGURE 1 of the drawings and a rearward pull on the other free end portion of the tension member 108 will move the cover assembly 28 to the fully retracted position illustrated in FIGURE 6 of the drawings.

As can best be seen from FIGURE 4 of the drawings a second pair of inclined brace members 114 are provided and each includes an outer tubular upper end portion 116 which telescopically receives a lower section 118, the latter having an abutment collar 120 mounted thereon and an expansion spring 122 disposed thereabout above the abutment collar 120 and below the lower end of the upper tubular section 116. In this manner, the inclined brace member 114 is yieldably urged toward an extended position. The lower end of each brace member 114 is removably secured in a slot formed in the corresponding upper wall 64 and the upper end of each inclined brace member 114 includes a laterally directed shank portion 126 which is removably received within an accommodating opening formed in the upper portion of the corresponding leg 78 of the rearmost movable bow 76.

A flexible cover 128 including a top wall portion 130 and a pair of opposite side wall portions 132 together with a depending front wall portion 134 and a rear wall portion 136 is provided. The cover 128 is disposed over the bows 52 and 76 and includes pockets 138 and 140 sewn to the inner surfaces thereof in which the fixed and movable bows 52 and 76 are secured. The lower end portion of the front wall portion 134 includes an enlarged bead portion 144 which is secured within the bead retaining channel member 46 and the lower edge portion of the side wall portions 132 include a plurality of fasteners 148 which are removably engaged with coacting fasteners 150 secured to the outer wall 152 of the corresponding tubular members 30. In addition, the rear wall portion 136 includes a center portion 156 which may be rolled to a raised position such as illustrated in FIGURE 6 of the drawings and retained in the raised position by means of supporting straps 158 provided with snap members 160 on their free ends which are engageable with the snap elements 162 secured to the undersurface of the top wall portion 130 of the cover 128. Further, a pair of slide fasteners 164 are provided for securing the opposite side edges of the center portion 156 to the remaining portions of the rear wall portion 136 when the center portion 156 is in the lowered position.

The extensible legs 54 and 78 of the bows 52 and 76 together with the fasteners 148 provide means whereby the cover may be transversely tensioned. In addition, the extensible inclined braces or brace members 114, when combined with the cover 128 may be longitudinally tensioned. It will be noted that the offset end portions 72 of each of the rigid braces 66 provides clearance for the adjacent movable bow 76 to move into close proximity with the fixed bow 52. In addition each guide member 28 rotatably journals a double grooved pulley 168 adjacent its rear end and that the free ends of the associated tension member 108 are held captive in their respective grooves thereby maintaining the free ends of the tension members 108 in order for proper identification of each free end portion eliminating the necessity of using the "trial and error" method of choosing the correct end portion.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with the load bed of a pickup truck of the type including upstanding side walls, a retractable flexible truck body cover assembly with tension control, said body cover assembly comprising a pair of elongated guide members secured to and extending along the upper marginal edge portions of said side walls, a plurality of follower members slidingly engaged with each of said guide members for movement longitudinally thereof, a plurality of inverted generally U-shaped bows each including a pair of depending legs interconnected at their upper ends by means of a bight portion and supported from their lower ends from corresponding pairs of said follower members, an elongated cover disposed over said bows with the latter secured to said cover at points spaced longitudinally thereof, the lower portions of the opposite sides of said cover including means spaced longitudinally thereof releasably securing said lower portions in fixed relation relative to said load bed at points spaced longitudinally therealong, each of said legs including a longitudinally extendable lower member yieldingly urged toward an extended position whereby said cover will be vertically and transversely tensioned, said cover assembly further including an additional bow also having longitudinally extendable lower end leg members yieldingly urged toward extended positions, the lower ends of said extendable members of said additional bow being secured and stationarily positioned relative to one pair of corresponding ends of said guide members, a pair of rigid inclined brace members including laterally outwardly offset upper ends secured to the upper ends of the legs of said additional bow and lower end portions secured to said guide members at points spaced from the lower ends of the last mentioned legs toward the other ends of said guide members, a second pair of elongated, inclined and longitudinally extendable braces secured at their lower ends to said guide members a spaced distance from said other ends thereof and removably secured at their upper ends to the upper ends of the legs of the rearmost movable bow from said additional bow, said second pair of extendable braces having urging means mounted thereon yieldingly urging said extendable braces toward extended positions.

2. The combination of claim 1 including a pair of pulley means journalled from said one pair of corresponding ends of said guide members, a pair of pull members entrained over said pulley means, extending to the other ends of said guide members and secured to the follower members supporting the bow remote from said additional bow.

3. The combination of claim 1 wherein said pickup truck includes a cab portion disposed forwardly of said load bed and including a rear wall portion having a rear window opening therein, said elongated cover including a rear wall having a window opening therein horizontally and longitudinally aligned with said truck cab rear window opening, said cover also including a front wall disposed immediately rearwardly of the rear wall of said cab and having a window opening therein in horizontal and longitudinal alignment with said rear wall window openings.

References Cited by the Examiner

UNITED STATES PATENTS

| 1,263,759 | 4/18 | Hanaway | 296—105 |
| 2,239,888 | 4/41 | Forrester | 296—105 |
| 2,670,988 | 3/54 | Cook | 296—105 |
| 2,817,344 | 12/57 | Teeter | 296—100 X |

FOREIGN PATENTS

| 156,413 | 1/21 | Great Britain. |
| 157,640 | 1/21 | Great Britain. |
| 172,129 | 12/21 | Great Britain. |

A. HARRY LEVY, *Primary Examiner.*